(12) United States Patent
Albert et al.

(10) Patent No.: US 10,871,217 B2
(45) Date of Patent: Dec. 22, 2020

(54) BEARING ASSEMBLY FOR SUPPORTING A HELICAL GEAR SHAFT OF A HELICAL PLANETARY GEAR AND METHOD FOR PRODUCING SUCH A BEARING ASSEMBLY, INCLUDING A HELICAL PLANETARY GEAR AND MOTOR-GEAR ASSEMBLY, IN PARTICULAR FOR AN ADJUSTMENT DEVICE IN VEHICLES FOR ADJUSTING TWO MUTUALLY ADJUSTABLE VEHICLE PARTS

(71) Applicant: IMS Gear SE & Co. KGaA, Donaueschingen (DE)

(72) Inventors: Simon Albert, Bonndorf im Schwarzwald (DE); Matthias Kieninger, Villingen-Schwenningen (BE); Stephan Oberle, Unterkirnach (DE)

(73) Assignee: IMS Gear SE & Co. KGaA, Donaueschingen (DE)

( * ) Notice: Subject to any disclaimer, the term of this patent is extended or adjusted under 35 U.S.C. 154(b) by 0 days.

(21) Appl. No.: 16/277,320

(22) Filed: Feb. 15, 2019

(65) Prior Publication Data
US 2019/0257404 A1 Aug. 22, 2019

(30) Foreign Application Priority Data

Feb. 19, 2018 (EP) .................................... 18000163

(51) Int. Cl.
*F16H 57/021* (2012.01)
*F16H 1/30* (2006.01)
(Continued)

(52) U.S. Cl.
CPC ............. *F16H 57/021* (2013.01); *F16H 1/30* (2013.01); *F16H 2057/0213* (2013.01);
(Continued)

(58) Field of Classification Search
None
See application file for complete search history.

(56) References Cited

U.S. PATENT DOCUMENTS 1,276,855 A * 8/1918 Apple ....................... F16H 1/30
475/333
1,567,933 A * 12/1925 Fahnestock .............. B62D 1/10
475/333

(Continued)

FOREIGN PATENT DOCUMENTS

| DE | 19928385 | 12/2000 |
|---|---|---|
| EP | 2166252 | 3/2010 |
| WO | 2015036328 | 3/2015 |

OTHER PUBLICATIONS

European Patent Office, "European Search Report," issued in European Patent Application No. 18 000163.8, dated Sep. 7, 2018, document of 10 pages.

*Primary Examiner* — Dirk Wright
(74) *Attorney, Agent, or Firm* — Akerman LLP; Peter A. Chiabotti

(57) ABSTRACT

A bearing assembly for supporting a helical-wheel shaft of a helical planetary gear, in particular an adjustment device in vehicles for adjusting two mutually adjustable vehicle parts, wherein the helical-wheel planetary gear is a helical-wheel shaft with a helical-gear toothing, which shaft is rotatably mounted about a helical-wheel shaft axis, and a planetary carrier comprising at least three helical planetary gears, each rotatably mounted in the planetary carrier about a planetary gear axis, and each having a planetary gear toothing, wherein the helical gear planetary axes extend obliquely to the helical-wheel shaft axis, and the bearing assembly for supporting the helical gear shaft has a first bearing section and a second bearing section, wherein the first bearing section consists of an axial and radial bearing, and the (Continued)

second bearing section consists of helical-wheel planetary gears, wherein the planetary gear toothing in the second bearing section meshes with the helical-gear toothing.

4 Claims, 4 Drawing Sheets

(51) Int. Cl.
*F16H 57/02* (2012.01)
*F16H 57/08* (2006.01)
*H02K 7/116* (2006.01)

(52) U.S. Cl.
CPC .............. *F16H 2057/02086* (2013.01); *F16H 2057/085* (2013.01); *H02K 7/116* (2013.01)

(56) References Cited

U.S. PATENT DOCUMENTS

| | | | |
|---|---|---|---|
| 4,777,847 A * | 10/1988 | Pickles | F16H 1/30 475/149 |
| 9,789,898 B2 * | 10/2017 | Galehr | B62D 5/008 |
| 10,344,532 B2 * | 7/2019 | Mazzoni | F16H 1/30 |
| 10,605,353 B2 * | 3/2020 | Albert | F16H 1/30 |
| 2016/0160560 A1 | 6/2016 | Massoni | |
| 2019/0154118 A1 * | 5/2019 | Koop | F16H 55/0853 |
| 2019/0154139 A1 * | 5/2019 | Albert | F16H 57/082 |
| 2019/0257411 A1 * | 8/2019 | Albert | F16H 57/0018 |
| 2019/0260265 A1 * | 8/2019 | Albert | F16H 1/28 |

* cited by examiner

BEARING ASSEMBLY FOR SUPPORTING A HELICAL GEAR SHAFT OF A HELICAL PLANETARY GEAR AND METHOD FOR PRODUCING SUCH A BEARING ASSEMBLY, INCLUDING A HELICAL PLANETARY GEAR AND MOTOR-GEAR ASSEMBLY, IN PARTICULAR FOR AN ADJUSTMENT DEVICE IN VEHICLES FOR ADJUSTING TWO MUTUALLY ADJUSTABLE VEHICLE PARTS

CROSS-REFERENCE TO RELATED APPLICATIONS

This application claims priority to European Patent Application No. 18 000163.8, filed Feb. 19, 2018, which is incorporated by reference in its entirety.

BACKGROUND

The present application relates to a bearing assembly for supporting a helical gear shaft of a helical planetary gear, in particular for an adjustment device in vehicles for adjusting two mutually adjustable vehicle parts. Furthermore, the application relates to a helical planetary gear, in particular for an adjustment device in vehicles for adjusting two mutually adjustable vehicle parts, which gear has such a bearing assembly. Moreover, the application relates to a motor-gear assembly with an electric motor and such a helical planetary gear. In addition, the application relates to a method for producing a bearing assembly, as mentioned in the introduction.

SUMMARY

Planetary gears are used in many drive trains, as they allow high speed or reduction ratios within a small space. Auxiliary drives for motor vehicles, with which two mutually adjustable vehicle parts can be moved relative to each other, represent one area of application. An example of such auxiliary drives are electromechanical actuator assemblies, which, among other things, are used to actuate parking brakes in motor vehicles. Alternative auxiliary drives are used, e.g., for seat-length adjustments, tailgate adjustments, window openers and sunroof adjustments. As the available space in motor vehicles is limited, the advantages of planetary gears are particularly beneficial in this regard.

Auxiliary drives use almost exclusively electric motors as their source of motive power. The electric motors typically used often turn over at a comparatively high speed, so that high reduction ratios are needed for adjusting the vehicle parts to their desired, comparatively slow movement relative to one another. In addition, torques delivered by the electric motor are often inadequate in order to move the vehicle parts, another reason why gear reductions are needed.

Although known planetary gears are able to provide high speed or reduction ratios, this is insufficient for some application areas, making it necessary to use two- or multi-stage transmission, wherein two or more planetary gear are arranged within the drive train. This increases the complexity of the drive train, which complicates production, when compared with a single-stage helical planetary gear, increases the probability of failure and enlarges the installation space.

Using so-called "coaxial gearboxes" is one way of increasing the speed or reduction ratios of planetary gears. The gear wheels of conventional planetary gears are designed as cylindrical gears. In coaxial transmissions, the sun gear is designed as a worm and the planetary gears are designed with an appropriately adapted planetary gear toothing. The crown wheel has internal toothing corresponding to the planetary gear toothing.

A particularly noticeable feature of such coaxial gears is the fact that the planetary gear axes do not extend parallel to the axis of rotation of the worm, but obliquely thereto. At least in this regard, the term "coaxial gear" is inappropriate, which is why such gears are referred to below as worm-planetary gears. Such worm-planetary gears are disclosed, e.g., in WO 2015/036328 A1 and EP 2 166 252 A1. Besides the high speed or reduction ratios, such worm planetary gears provide smooth running characteristics and low noise generation.

Although these types of planetary gear provide high speed or reduction ratios and low noise generation, they characteristically have high axial forces acting upon the worm and the ring gear, which are facing in one or the opposite direction depending on the direction of rotation. In EP 2 166 252 A1, these axial forces, which are dependent on the direction of rotation, are used for axial displacement, e.g., of the ring gear, to lock the worm/planetary gear shown there for one direction of rotation and provide a type of self-locking effect. In this regard, EP 2 166 252 A1 does not provide for any particular steps for absorbing the acting axial forces. In WO 2015/036328 A1, the shaft on which the worm is arranged is mounted with two bearings on each side of the worm within the planetary carrier. This requires a certain amount of installation space and moreover, complicates assembly.

One embodiment of the present application provides a bearing assembly for a helical gear shaft of a helical planetary gear with helical planetary wheel axles extending obliquely to the helical gear shaft axis, thus allowing for the above-mentioned disadvantages to be removed. In particular, the bearing assembly should allow for reducing the required installation space and simplifying assembly, when compared with the known planetary gears with helical planetary gears extending obliquely to the helical shaft axis.

Advantageous embodiments and further developments are disclosed.

An embodiment of the present application relates to a bearing assembly for supporting a helical gear shaft of a helical planetary gear, in particular an adjustment device in vehicles for adjusting two mutually adjustable vehicle parts, wherein the helical planetary gear is a helical gear shaft with helical gear toothing, which is rotatably mounted about a helical gear shaft axis, and a planetary carrier comprising at least three helical gear planetary gears each mounted rotatably about a planetary wheel axle, and each having planetary gear toothing, wherein the helical gear planetary axes extend obliquely to the helical gear shaft axis, and wherein the bearing assembly for supporting the helical gear shaft has a first bearing section and a second bearing section; wherein the first bearing section is arranged outside the planetary carrier and consists of an axial and radial bearing, and the second bearing section consists of the helical planetary gears, and wherein the planetary gear toothing in the second bearing section meshes with the helical gear toothing.

A helical gear shaft refers to a part, which is rotatably mounted with the bearing assembly, and which part has helical gear toothing. In particular, the helical-gear shaft should be driven by a motor shaft.

The present application relates to helical planetary gears, i.e., not worm planetary gears, as disclosed in WO 2015/036328 A1 and EP 2 166 252 A1. However, helical planetary gears are very similar to worm planetary gears. While helical planetary gears are in point-like contact at the helical gear with the helical planetary gears, which under stress becomes a so-called pressure ellipse, worm planetary gears are in linear contact due to the globoid shape of the toothing section of the worm as are the planetary gears. However, in both types of planetary gears, large axial forces act on the worm shaft or the helical gear shaft.

As the first bearing section of the proposed bearing arrangement of the helical gear shaft consists of an axial and a radial bearing, the acting axial forces may be absorbed completely or almost completely by the first bearing section. The second bearing section is formed by the helical planetary gears, which are designed to provide particularly good radial guidance of the helical gear shaft in the area of the helical gear toothing. Moreover, the use of at least three helical planetary gears contributes to good radial guidance of the helical gear shaft in the second bearing section. Thus, in contrast to the bearing arrangement shown in WO 2015/036328 A1, a second axial and radial bearing is no longer needed. As a result, the axial installation space is reduced, and moreover, the assembly of the proposed bearing assembly is simplified. Compared with the bearing assembly shown in WO 2015/036328 A1, assembly is also simplified in that the axial and radial bearings are arranged outside the planetary carrier. As the number of parts is reduced, the costs of the proposed bearing assembly may also be reduced compared with the known bearing assemblies. Furthermore, reducing the number of parts results in a reduction in the probability of failure of the bearing assembly.

It was shown that in the specified ranges for convexity and profile overlaps, particularly good mounting of the helical gear shaft can be achieved in the second bearing section, thus producing smooth running characteristics with low noise generation. The profile overlap indicates how many pairs of toothing statistically are engaged at the same time. To ensure continuous transmission of torque, the degree of overlap must be at least 1. If the value of the degree of overlap is between 1 and 2, continuous torque transmission can be ensured.

In a further developed embodiment, the helical gear shaft can have a first and a second end, and the helical gearing extend to the second end. Production of the helical gear shaft may be simplified in that the helical shaft need not be extended beyond the helical gear toothing to the second end. A tool for producing the helical gear toothing may be placed directly on the helical gear shaft. Undercuts or similar measures allowing the tool to exit are not required. Furthermore, the helical gear shaft may have a relatively short axial extension making it possible to save on material and bulk.

According to a further developed embodiment, the helical gear shaft has a first and a second end, whereby the helical gear toothing forms a free end directed toward the second end and the helical gear shaft comprises a cylindrical section between the second end and the free end. The cylindrical section, in particular, is used to receive the helical gear shaft during assembly. In addition, providing the cylindrical section is advantageous in metrological terms.

In a further embodiment, the axial and radial bearings may consist of a rolling bearing and, in particular, a ball bearing. Rolling bearings and, in particular, ball bearings may also absorb comparatively high axial forces and at the same time provide radial guidance. Consequently, the axial and radial bearings can be realized by just one part, which simplifies assembly and reduces the number of parts to a minimum. Ball bearings are a particularly cost-effective alternative for absorbing both axial and radial forces An embodiment of the present disclosure relates to a helical planetary gear, in particular for an adjustment device in vehicles for adjusting two mutually adjustable vehicle parts, comprising a helical-wheel shaft with helical-wheel teeth, which is rotatably mounted about a helical-wheel shaft axis, a planetary carrier with at least three helical planetary gears, each rotatably mounted about a planet wheel axle in the planetary carrier, and each having planetary wheel toothing, whereby the helical planetary gear axes extend obliquely to the helical gear shaft axis, an inner helical gear with inner toothing, which meshes with the planet wheel toothing, and a bearing assembly for supporting the helical gear shaft according to one of the previous embodiments.

An embodiment of the present disclosure relates to a motor-gear assembly, in particular for an adjustment device in vehicles for adjusting two mutually adjustable vehicle parts comprising an electric motor and a helical planetary gear according to the embodiment described above, wherein the electric motor has a motor shaft which is non-rotatably connected to the helical gear shaft.

The technical effects and advantages that can be achieved with the proposed helical planetary gear and the proposed motor-gear assembly correspond to those discussed for the present bearing assembly. In summary, it should be noted that contrary to the helical planetary gear shown in WO 2015/036328 A1, a second axial and radial bearing can is no longer needed. As a result, the axial installation space is reduced, and what's more, the assembly of the proposed bearing assembly is simplified.

The following technical effect also result for the engine/transmission assembly: The bearing assembly is designed such that it completely or almost completely absorbs the acting axial forces. As a result, only minor axial forces or none at all act on the motor shaft, such that the motor shaft bearing does not need to be adapted. Consequently, almost any electric motor may be used for the motor-gear assembly described here without significant design modifications, thus making it suitable for a wide range of applications A further embodiment is characterized in that the internal helical gear is non-rotatably connected to the electric motor. Generally, fastening the internal helical gear to the electric motor in a non-rotatable manner is simpler than connecting the inner helical gear rotatably, although axially secured, with the electric motor. In addition, the motor-gear assembly has no external rotatable parts, as the inner helical gear encloses the rotating planetary carrier, thus increasing operational safety of the motor-gear assembly.

In a further developed embodiment of the motor-gear assembly, the axial and radial bearing is arranged in a bearing seat located between the electric motor and the inner helical gear and rotationally fixed to the electric motor and the inner helical gear. Due to the bearing seat, in particular, the acting axial forces may be transmitted into the motor-gear assembly, such that the motor shaft, in particular, is not subjected to axial load or only to a limited extent. Damage to the motor-shaft bearing due to excessive exposure to acting axial forces is particularly effectively avoided on account of the bearing seat. The arrangement of the axial and radial bearing between the electric motor and the inner helical gear makes it possible to arrange the axial and radial bearing outside of the planetary carrier, thereby simplifying the assembly of the motor-gear assembly, e.g., in comparison to a motor-gear assembly disclosed in WO 2015/036328 A1.

According to a further embodiment, the bearing seat is molded around the axial and radial bearing. After removal of the bearing seat from an appropriately equipped injection compressing tool, a unit consisting of the bearing seat and the axial and radial bearing comes about, without requiring any assembly step in order to secure the axial and radial bearing in the bearing seat. As a result, assembly is simplified.

An implementation of the present disclosure relates to a method for producing a bearing arrangement according to one of the previously disclosed embodiments, comprising the following steps:

Providing a helical gear shaft having a first end, a second end, and a helical gear toothing;

Providing a first bearing section by means of an axial and radial bearing;

Providing a planetary carrier having at least three helical planetary gears, each mounted rotatably about a planetary wheel axle in the planetary carrier, and each having a planetary gear toothing, wherein the helical planetary gear axes extend obliquely to the helical gear shaft axis, and the planetary gears form a second bearing section;

Inserting the helical gear shaft into the first bearing section with the first end; and Inserting the helical gear shaft into the second bearing section with the second end, such that the planetary gears in the second bearing section mesh with the helical gear toothing.

The technical effects and advantages that can be achieved with the proposed method are identical to those discussed for the present bearing assembly. In summary, it should be noted that it is possible to forgo a second axial and radial bearing. As a result, the axial installation space is reduced, and what's more, assembly of the proposed bearing assembly is simplified.

Furthermore, a variant of the present disclosure relates to the use of a helical planetary gear according to one of the above-mentioned embodiments, as well as the use of a motor-gear assembly according to one of the previously discussed embodiments for flap assemblies. Such flap assemblies relate, in particular, to motor-vehicle tailgates. Motor-gearbox assemblies used in connection with driven flap assemblies are subject to a number of limitations, in particular in terms of available installation space, which, specifically, requires that a relatively complex and thus expensive drive solution be chosen, and moreover increases the risk of gearbox jamming due to force load, which may also vary depending on the flap position. The proposed motor-gear assembly and helical planetary gear meet these requirements especially well, as they require a short axial installation space and have a low tendency to jam.

BRIEF DESCRIPTION OF THE DRAWINGS

Exemplary embodiments of the present application are explained in more detail below with reference to the accompanying drawings. In the drawings.

DETAILED DESCRIPTION

Figure 1A:
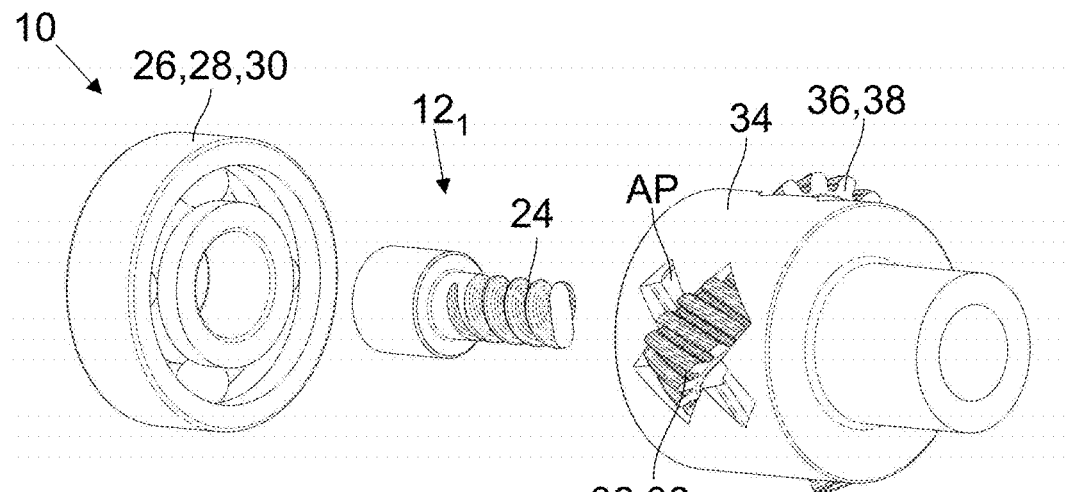
FIG. 1a) an exemplary embodiment of a proposed bearing assembly in a perspective view.
Figure 1B:
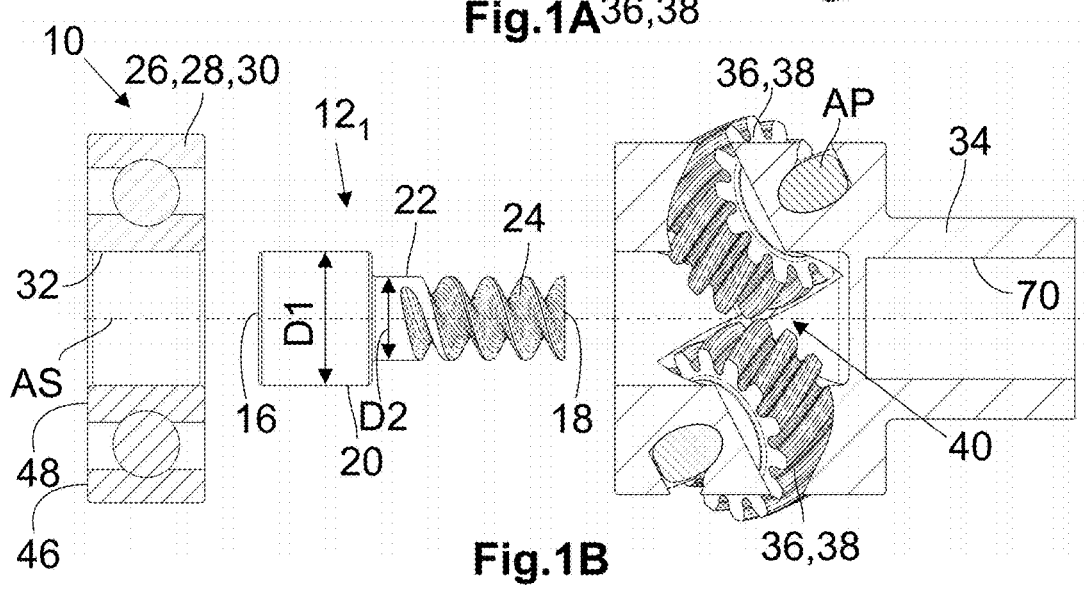
FIG. 1b) the exemplary embodiment shown in FIG. 1a) in a lateral partial sectional view, each in the unassembled state.
Figure 7:
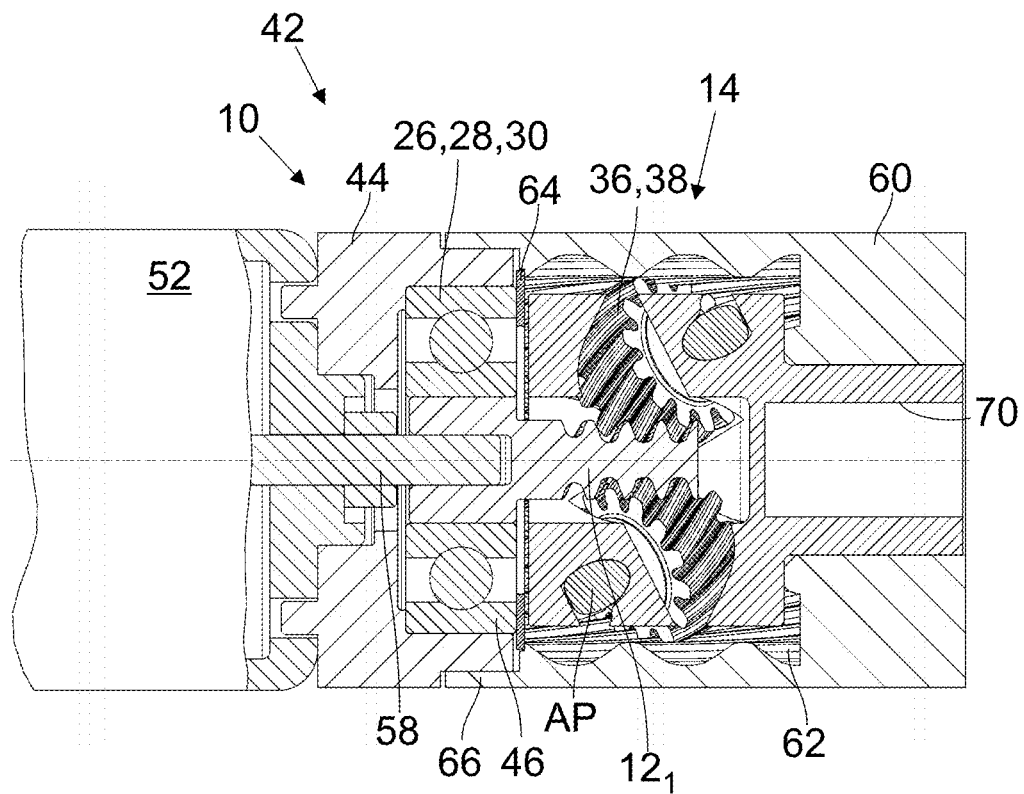

FIGS. 1a) to 1c) show an exemplary embodiment of a bearing assembly 10 according to the present disclosure for supporting a first embodiment of a helical gear shaft $12_1$ of a helical planetary gear 14 (see FIG. 7). In FIG. 1a), the bearing assembly 10 is shown in a perspective view, while in FIG. 1b), the bearing assembly 10 is shown in a side view, showing the bearing assembly 10 in partial section there. Both in FIG. 1a) and FIG. 1b), the bearing assembly 10 is shown in the unassembled state, while FIG. 1c), shows the assembled state.

The bearing assembly 10 includes the helical gear shaft $12_1$, which has a first end 16 and a second end 18. The helical gear shaft $12_1$ can be divided into a first section 20 and a second section 22, each having a substantially cylindrical shape. The first section 20 has a first diameter D1 and the second section 22 has a second diameter D2, the first diameter D1 being larger than the second diameter D2. The first section 20 forms the first end 16, while the second section 22 forms the second end 18.

In addition, the helical gear shaft $12_1$ has helical gear toothing 24 arranged on the second section 22 and extending from the second end 18.

Furthermore, the bearing assembly 10 comprises an axial and a radial bearing 26, which in the illustrated embodiment is designed as a rolling bearing 28, here as a ball bearing 30. The axial and radial bearing 26 forms a first bearing section 32 for supporting the helical gear shaft $12_1$.

In addition, the bearing assembly 10 comprises a planetary carrier 34, in which three planetary gears 36 are rotatably mounted about a planetary wheel axle AP. The planetary gears 36 have planetary gear toothing 38, which is matched to the helical gear toothing 24 of the helical gear shaft $12_1$. The planetary gear toothing 38 form a second bearing section 40 for supporting the helical gear shaft $12_1$.

Figure 1C:
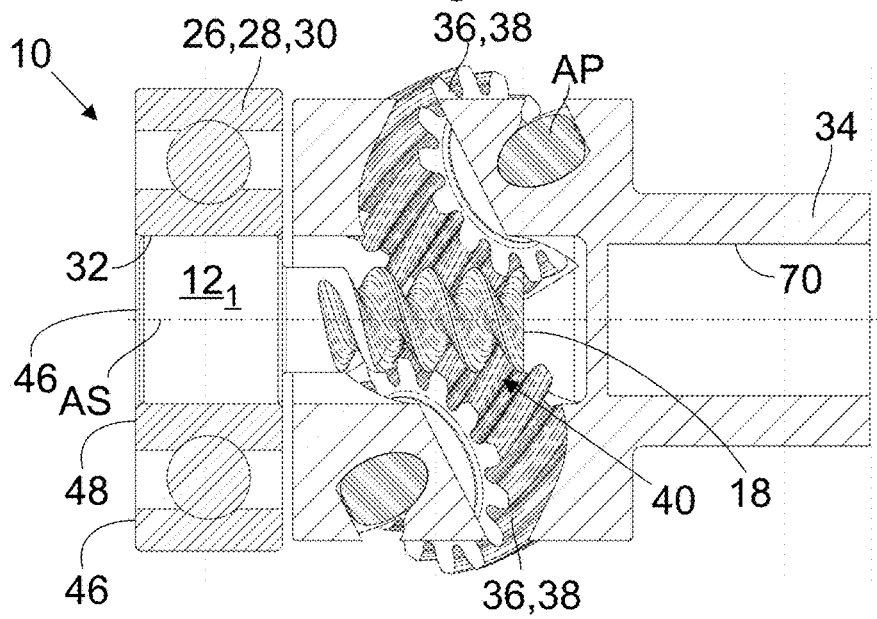
FIG. 1c) the exemplary embodiment shown in FIG. 1a) in a lateral partial sectional view in the assembled state.

As shown, in particular, in FIG. 1c), the first section of the helical gear shaft $12_1$ (20) is inserted into the axial and radial bearing 26, such that radially and axially acting forces may be transmitted from the helical gear shaft $12_1$ to the axial and radial bearing 26. For this purpose, the helical gear shaft $12_1$ may be molded with the first section 20 in the axial and radial bearings 26. Furthermore, the helical gear shaft $12_1$ with the helical gear toothing 24 is inserted into the second bearing section 40, such that the planetary gear toothing 38 of the planetary gears 36 meshes with the helical gear toothing 24. The helical gear shaft $12_1$ is thus rotatably mounted about a helical gear axis AS. It should be noted that the helical planetary wheel axles AP of the planetary gears 36 extend obliquely to the helical gear axle AS, as shown, in particular, in FIG. 1c).

FIG. 1c), furthermore, shows that the second end 18 of the helical gear shaft $12_1$ does not project axially beyond the planetary gears 36 in the assembled state, but is enclosed sectionally by the helical gear planetary gears 36. Moreover, FIG. 1c) shows that the first bearing section 32 is arranged outside of the planetary carrier 34. The pressing of the helical gear shaft $12_1$ in the axial and radial bearings 26 can thus also be done outside of the planetary carrier 34, which simplifies assembly.

FIGS. 2-7 show various process steps for producing a proposed motor-gear assembly 42 having the helical planetary gear 14 with the bearing assembly 10 shown in FIGS. 1a)-1c).

Figure 2:
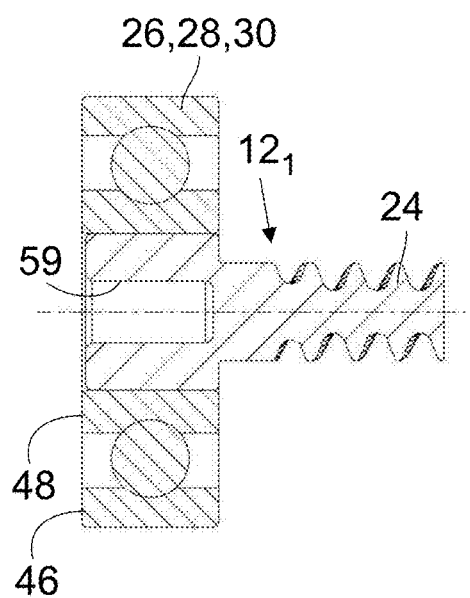
FIGS. 2-7 Various assembly steps for producing a proposed motor-gear assembly having a helical planetary gear with the bearing assembly shown in FIG. 1a), both in perspective views and lateral partial sectional views.

Based on FIG. 1a), the helical gear shaft $12_1$ with its first section 20 is first pressed in the axial and radial bearing 26 to obtain the configuration shown in FIG. 2. The axial and radial bearing 26 shown in the exemplary embodiment formed as the ball bearing 30 has an outer 46 and an inner ring 48.

Figure 3:
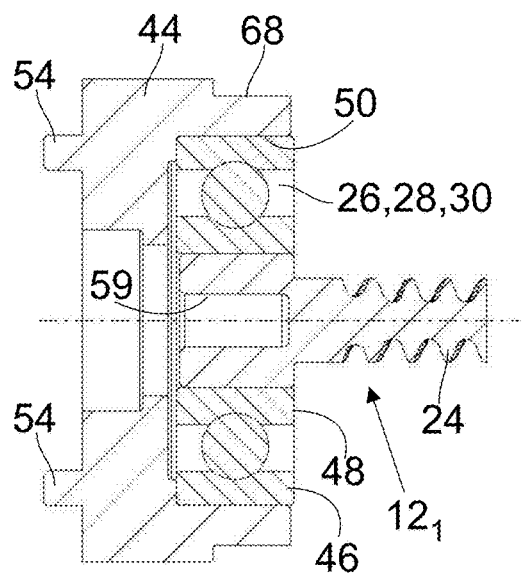

The axial and radial bearing 26 is subsequently inserted into a bearing seat 44, as shown in FIG. 3. The inner ring 48 is connected to the first section 20 of the helical gear shaft $12_1$. The bearing seat 44 has a recess 50, whose diameter is roughly equal to the outer diameter of the outer ring 46. The outer diameter of the outer ring 46 may exceed the diameter of the recess 50 somewhat allowing for the outer ring 46 to be secured in the recess 50 by means of frictional engagement. Furthermore, the outer ring 46 axially abuts the bearing seat 44 in the recess 50, such that the axial and radial bearing 26 is secured in an axial direction.

Figure 4:
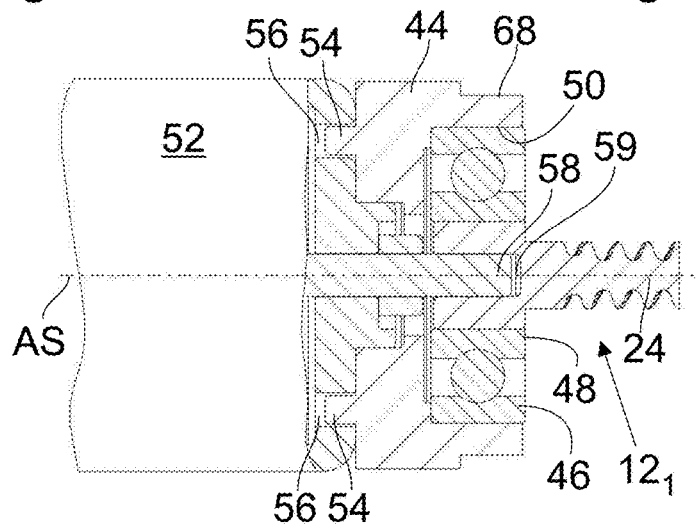

Subsequently, the bearing seat 44 is non-rotatably connected to an electric motor 52, as shown in FIG. 4. FIG. 3, in particular, shows that the bearing seat 44 has several projections 54, which engage in corresponding recesses 56 of the electric motor 52 and thus prevent the bearing seat 44 from rotating relative to the electric motor 52. To axially secure the bearing seat 44 against the electric motor 52, the projections 54 against the recesses 56 may be somewhat oversized in order for frictional locking to occur. Alternatively or cumulatively, the bearing seat 44 may also be glued, screwed or welded onto the electric motor 52.

The electric motor 52 has a motor shaft 58 which projects from the electric motor 52. The helical gear shaft $12_1$ forms a motor shaft holder 59, with which the motor shaft 58 engages, when the bearing holder 44 is connected to the electric motor 52. The cross sections of the motor shaft 58 and the motor shaft holder 59 are selected such that a torque may be transmitted. For this purpose, the cross sections may be, e.g., square or hexagonal.

Figure 5:
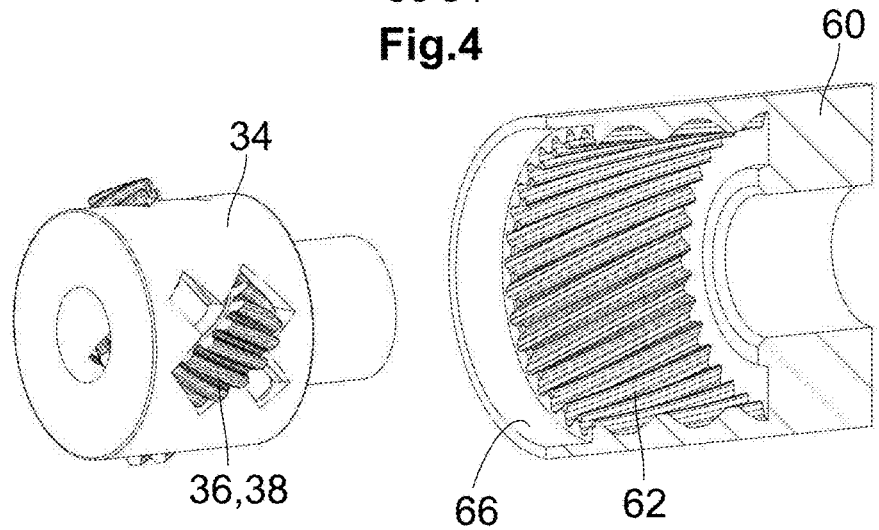
Figure 6:
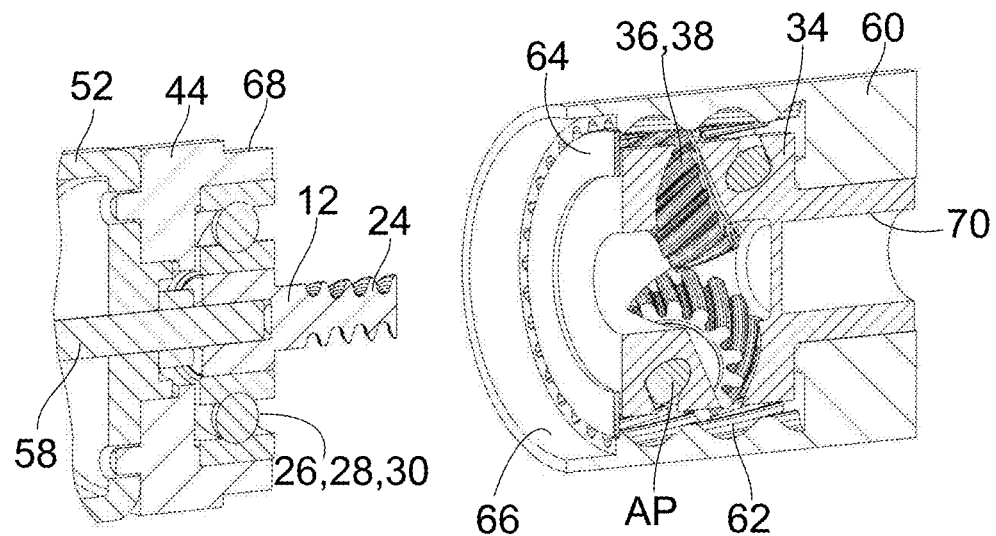

FIG. 5 shows the planetary carrier 34 as illustrated in FIGS. 1a)-1c), now inserted into an inner helical gear 60, which has an internal toothing 62 matching the planetary gear 38. As shown in FIG. 6, a shim 64 is inserted into the inner helical gear 60 and brought into axial contact with the inner helical gear 60, after inserting the planetary carrier 34 into the inner helical gear 60, such that the planetary gear toothing 38 meshes with the inner toothing 62 of the inner helical gear 60.

The inner helical gear 60 has an annular collar 66, with which the inner helical gear 60 is pushed onto a similarly shaped shoulder 68 of the bearing seat 44. Likewise, the helical gear toothing 24 is meshed with the planetary gear 38. The ball bearing 30 with the outer ring 46 rests against the shim 64, such that the ball bearing 30 rests axially against the bearing seat 44, and also against the shim 64, and is thus axially secured.

In order to connect the inner helical gear 60 and the bearing seat 44 with one another, the inner helical gear 60 and the bearing seat 44 are welded together, e.g., by laser-transmission welding. The motor-gear assembly 42 is now fully installed. The inner helical gear 60 is rotatably secured to the bearing seat 44, which in turn is rotatably connected to the electric motor 52.

The helical planetary gear 14 consists of the helical-gear shaft $12_1$, the planetary carrier 34, the helical planetary gears 36, and the inner helical gear 60. As the inner helical gear 60 is rotationally fixed, the power take-off occurs via the rotating planetary carrier 34, which has a slaving means 70 for a not-shown output shaft.

Figure 8A:
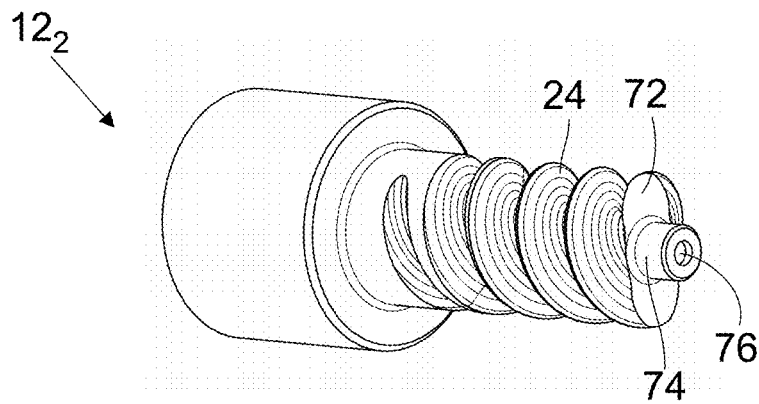
FIGS. 8a) and 8b) Various illustrations of a helical gear shaft.
Figure 8B:
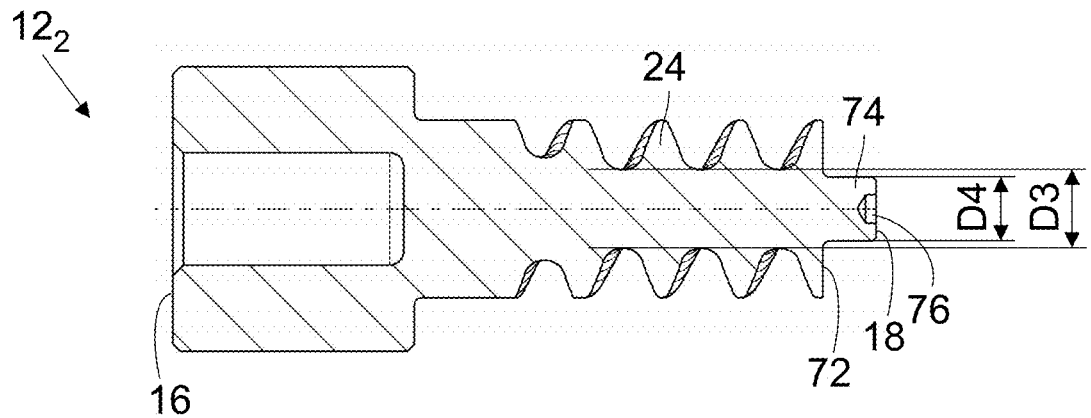

FIGS. 8a) and 8b) show a second exemplary embodiment of the helical gear shaft $12_2$ in a perspective and a sectional view. In the second exemplary embodiment, the helical gear toothing 24 does not extend to the second end 18 of the helical gear shaft $12_2$, instead the helical gear toothing 24 forms a free end 72. Between the free end 72 and the second end 18 of the helical gear shaft $12_2$, a cylindrical section 74 is arranged, in which an axially extending bore 76 is arranged. The helical gear toothing 24 has a root diameter D3, which is greater than a diameter D4 of the cylindrical section 74.

Figure 9:
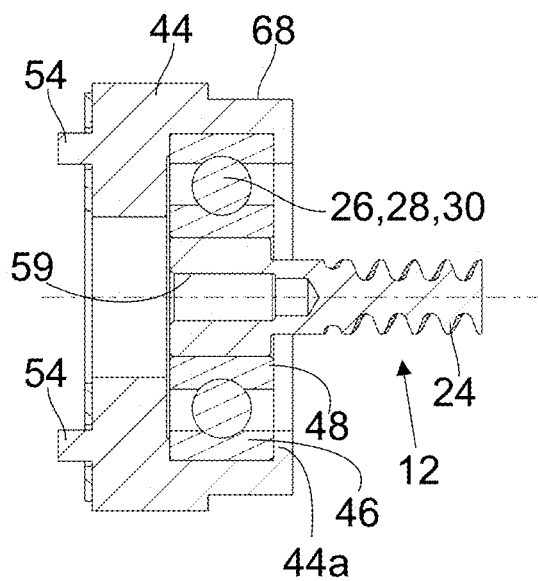
FIG. 9 a separate illustration of another embodiment of a bearing seat.

Although a shim 64 is provided for mounting, in conjunction with FIG. 7, this shim 64 is optional if the bearing seat 44—as shown in FIG. 9—has an anterior, inwardly projecting flange 44a, and this circumferential flange encloses the ball bearing 30, at least at its outer ring 46.

FIG. 9 shows a further exemplary embodiment of a bearing seat in a sectional view, which is essentially the same as the sectional view of FIG. 3. In contrast to the illustration shown in FIG. 3, the bearing seat 44 is injection-molded around the axial and radial bearing 26. Consequently, when injection-molding the bearing seat 44, a unit consisting of the bearing seat 44 and the axial and radial bearing 26 is created, whereby the assembly step of inserting the axial and radial bearing 26 into the bearing seat 44 is omitted, thus simplifying assembly. Furthermore, the use of the shim 64 can be done away with, thus reducing the number of parts in this embodiment.

REFERENCE NUMERAL LIST

10 Bearing assembly
12, $12_1$, $12_2$ Helical gear shaft
14 Helical planetary gear
16 First end
18 Second end
20 First section
22 Second section
24 Helical gear toothing
26 Axial and radial bearing
28 Rolling bearing
30 Ball bearing
32 First bearing section
34 Planetary carrier
36 Planetary gear
38 Planetary gear toothing
40 Second bearing section
42 Motor-gear assembly
44 Bearing seat
46 Outer ring
48 Inner ring
50 Recess
52 Electric motor
54 Projection
56 Recess
58 Motor shaft
59 Motor-shaft holder
60 Inner helical gear
62 Inner toothing
64 Shim
66 Collar
68 Shoulder
70 Slaving means
72 Free end
74 Cylindrical section
76 Bore
AP Planetary wheel axle AS Helical gear shaft axis
D1 First diameter
D2 Second diameter
D3 Root diameter
D4 Diameter of cylindrical section

The invention claimed is:

1. A helical planetary gear system, comprising:
an electric motor, and
a helical gear shaft with helical-gear toothing, is the helical gear shaft being rotatably mounted about a helical gear axis;
a planetary carrier having at least three helical planetary gears, each helical planetary gear of the at least three helical planetary gears mounted rotatably about a planetary gear axis in the planetary carrier, and each helical planetary gear of the at least three helical planetary gears having planetary gear toothing, wherein the helical planetary gear axes extend obliquely to the helical gear shaft axis;
an inner helical gear having an inner toothing, which meshes with the planetary gear toothing;
a bearing assembly for supporting the helical gear shaft comprising a first bearing section and a second bearing section;
wherein the first bearing section is arranged outside the planetary carrier and comprises an axial and radial bearing;
wherein the second bearing section comprises the helical planetary gears;
a bearing seat, wherein the axial and radial bearing is arranged in the bearing seat, and wherein the bearing seat is arranged between the electric motor and the inner helical gear; and
wherein the electric motor has a motor shaft, which is non-rotatably connected to the helical gear shaft.

2. The helical planetary gear system according to claim 1, wherein the inner helical gear is non-rotatably connected to the electric motor.

3. The helical planetary gear system according to claim 1, wherein the bearing seat is molded around the axial and radial bearing.

4. A method for producing a helical planetary gear system, comprising:
providing a helical gear shaft having a first end, a second end, and a helical gear toothing;
providing a first bearing section with an axial and radial bearing;
providing a planetary carrier having at least three helical planetary gears, each helical planetary gear of the at least three helical planetary gears rotatably mounted about a planetary gear axis in the planetary carrier, and each helical planetary gear of the at least three helical planetary gears having a planetary gear toothing, wherein helical planetary gear axes extend obliquely to a helical gear shaft axis, and the planetary gears form a second bearing section;
inserting the helical gear shaft into the first bearing section with the first end; and
inserting the helical gear shaft into the second bearing section with the second end, such that the planetary gear toothing in the second bearing section meshes with the helical gear toothing.

* * * * *

UNITED STATES PATENT AND TRADEMARK OFFICE
CERTIFICATE OF CORRECTION

Page 1 of 1

PATENT NO. : 10,871,217 B2
APPLICATION NO. : 16/277320
DATED : December 22, 2020
INVENTOR(S) : Simon Albert, Matthias Kieninger and Stephan Oberle It is certified that error appears in the above-identified patent and that said Letters Patent is hereby corrected as shown below:

On the Title Page

Item (72) Inventors is:
Simon Albert, Bonndorf im Schwarzwald (DE); Matthias Kieninger, Villingen-Schwenningen (BE); Stephan Oberle, Unterkirnach (DE)

Please correct to read as follows:
--Simon Albert, Bonndorf im Schwarzwald (DE); Matthias Kieninger, Villingen-Schwenningen (DE); Stephan Oberle, Villingen-Schwenningen (DE)--

Signed and Sealed this
Sixteenth Day of March, 2021

Drew Hirshfeld
*Performing the Functions and Duties of the
Under Secretary of Commerce for Intellectual Property and
Director of the United States Patent and Trademark Office*